(12) United States Patent
Ziman

(10) Patent No.: US 10,679,411 B2
(45) Date of Patent: *Jun. 9, 2020

(54) SYSTEMS AND METHODS TO PROVIDE INTERACTIVE VIRTUAL ENVIRONMENTS

(71) Applicant: Cinemoi North America, LLC, Los Angeles, CA (US)

(72) Inventor: Daphna Davis Edwards Ziman, Beverly Hills, CA (US)

(73) Assignee: Cinemoi North America, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/038,793

(22) Filed: Jul. 18, 2018

(65) Prior Publication Data

US 2018/0342101 A1 Nov. 29, 2018

Related U.S. Application Data

(63) Continuation of application No. 15/093,603, filed on Apr. 7, 2016, now Pat. No. 10,062,208.

(60) Provisional application No. 62/145,403, filed on Apr. 9, 2015.

(51) Int. Cl.
```
G06T 19/00      (2011.01)
H04N 7/15       (2006.01)
G06F 3/14       (2006.01)
G06F 3/16       (2006.01)
G06F 3/147      (2006.01)
G06F 3/01       (2006.01)
```
(52) U.S. Cl.
CPC ............ *G06T 19/003* (2013.01); *G06F 3/011* (2013.01); *G06F 3/14* (2013.01); *G06F 3/147* (2013.01); *G06F 3/165* (2013.01); *H04N 7/157* (2013.01); *G09G 2370/16* (2013.01)

(58) Field of Classification Search
CPC ...................................................... G06T 19/003
USPC ........................................................ 345/633
See application file for complete search history.

(56) References Cited

U.S. PATENT DOCUMENTS

| | | | |
|---|---|---|---|
| 6,166,744 A | 12/2000 | Jaszlics et al. |
| 6,753,857 B1 | 6/2004 | Matsuura et al. |
| 7,626,569 B2 | 12/2009 | Lanier |
| 8,151,191 B2 | 4/2012 | Nicol, II |
| 8,182,320 B2 | 5/2012 | Coleman et al. |
| 8,493,408 B2 | 7/2013 | Williamson et al. |
| 8,606,458 B2 | 12/2013 | Hu |

(Continued)

OTHER PUBLICATIONS

International Patent Application PCT/US2016/026607, International Search Report and Written Opinion, dated Jul. 7, 2016.

*Primary Examiner* — Javid A Amini

(74) *Attorney, Agent, or Firm* — Greenburg Traurig

(57) ABSTRACT

An interactive virtual world having virtual display devices and avatars. Scenes in the virtual world as seen by the eyes of the avatars are presented on the user devices controlling the avatars. Media contents are played in the virtual display devices presented on the user devices, as if the media contents were virtually played in the virtual world and observed by the avatars. Real time communication channels are provided among the user devices to facilitate voice communications during the sharing of the experiences of viewing the media content in a close proximity setting in the virtual world using user devices that are remote to each other in real world.

20 Claims, 4 Drawing Sheets

(56) References Cited

U.S. PATENT DOCUMENTS

| | | |
|---|---|---|
| 8,606,493 B1 | 12/2013 | Gold et al. |
| 8,838,381 B1 | 9/2014 | Daily et al. |
| 8,885,882 B1 | 11/2014 | Yin et al. |
| 9,094,576 B1 | 7/2015 | Karakotsios |
| 9,282,309 B1 | 3/2016 | Cosic |
| 9,595,294 B2 | 3/2017 | Cosic |
| 10,062,208 B2 * | 8/2018 | Ziman .................. G06T 19/003 |
| 2004/0128350 A1 | 7/2004 | Topfl et al. |
| 2005/0131896 A1 | 6/2005 | Cao et al. |
| 2006/0067500 A1 | 3/2006 | Christofferson et al. |
| 2007/0072662 A1 | 3/2007 | Templeman |
| 2008/0234844 A1 | 9/2008 | Boustead et al. |
| 2008/0262910 A1 | 10/2008 | Altberg et al. |
| 2009/0046109 A1 | 2/2009 | Hamilton, II et al. |
| 2009/0070688 A1 | 3/2009 | Gyorfi et al. |
| 2009/0098524 A1 | 4/2009 | Walton |
| 2009/0210803 A1 | 8/2009 | Brignull et al. |
| 2010/0083148 A1 | 4/2010 | Finn et al. |
| 2010/0100907 A1 | 4/2010 | Chang et al. |
| 2011/0010316 A1 | 1/2011 | Hamilton, II et al. |
| 2011/0077934 A1 | 3/2011 | Kanevsky et al. |
| 2011/0221745 A1 | 9/2011 | Goldman et al. |
| 2011/0302535 A1 | 12/2011 | Clerc et al. |
| 2011/0319169 A1 | 12/2011 | Lam et al. |
| 2012/0142429 A1 | 6/2012 | Muller |
| 2012/0162255 A1 | 6/2012 | Ganapathy et al. |
| 2012/0190444 A1 | 7/2012 | Fujisawa et al. |
| 2012/0204118 A1 | 8/2012 | Lefar et al. |
| 2013/0024117 A1 | 1/2013 | Pavetti et al. |
| 2013/0083173 A1 | 4/2013 | Geisner et al. |
| 2014/0063055 A1 | 3/2014 | Osterhout et al. |
| 2014/0063061 A1 | 3/2014 | Reitan |
| 2014/0068462 A1 | 3/2014 | Chang et al. |
| 2015/0066712 A1 | 3/2015 | Altieri |
| 2015/0193986 A1 | 7/2015 | Nistel et al. |
| 2015/0293668 A1 | 10/2015 | Kurabayashi |
| 2015/0301787 A1 | 10/2015 | Greco et al. |
| 2015/0317829 A1 | 11/2015 | Carter et al. |
| 2015/0356788 A1 | 12/2015 | Abe et al. |
| 2016/0026253 A1 | 1/2016 | Bradski et al. |
| 2016/0041391 A1 | 2/2016 | Van Curen et al. |
| 2016/0055676 A1 | 2/2016 | Kasahara et al. |
| 2016/0093108 A1 | 3/2016 | Mao et al. |
| 2016/0140768 A1 | 5/2016 | Sako et al. |
| 2016/0140999 A1 | 5/2016 | Cosic |
| 2016/0142650 A1 | 5/2016 | Cosic |
| 2016/0170975 A1 | 6/2016 | Jephcott |
| 2016/0257000 A1 | 9/2016 | Guerin et al. |
| 2016/0292966 A1 | 10/2016 | Denham |
| 2016/0300387 A1 * | 10/2016 | Ziman .................. G06T 19/003 |
| 2016/0379417 A1 | 12/2016 | Mount et al. |

* cited by examiner

SYSTEMS AND METHODS TO PROVIDE INTERACTIVE VIRTUAL ENVIRONMENTS

RELATED APPLICATIONS

The present application is a continuation application of U.S. patent application Ser. No. 15/093,603, filed Apr. 7, 2016 which claims the benefit of Provisional U.S. patent application Ser. No. 62/145,403, filed Apr. 9, 2015 and entitled "Systems and Methods for Interactive Virtual Environments," the entire disclosures of which applications are hereby incorporated herein by reference.

FIELD OF THE TECHNOLOGY

At least some embodiments disclosed herein relate to presentation of media content on user devices in general and more specifically but not limited to presentation of media content via a virtual reality environment.

BACKGROUND

Virtual reality (VR) can be used to create an illusion of reality or imagined reality. For example, a data processing system can be used to simulate a real or imaginary system and provide an environment for a user to interact with the simulated system. A user can perform operations on the simulated system, explore the simulated system and receive feedback in real time.

A virtual reality environment may primarily provide visual experiences, displayed on a computer screen or through stereoscopic display devices, such as head-mount displays (HMD), liquid crystal display (LCD) shutter glasses, polarized glasses, anaglyph glasses, etc. A three-dimensional (3D) system can be simulated such that the visual experience of the user depends on the viewpoint of the user; and the user may continuously adjust his or her viewpoint to obtain a personal view of the simulated system in real time. Some virtual reality environments provide additional sensory experiences, such as sound, touch, etc., (e.g., through speakers or headphones for audio, haptic systems for motion or force feedback, etc.).

A virtual reality environment can offer users immersion, navigation, and manipulation. A virtual reality environment can make the users feel that they are present in the simulated world and their visual experience in the virtual world more or less matches what they expect from the simulated environment, a sensation sometimes referred to as engagement or immersion.

Some virtual reality worlds support a Massively Multi-player Online Role Playing Game (MMORPG), in which a user represented by an avatar can interact with other users who are also represented by their corresponding avatars. Controlled by an input device such as a keyboard, an avatar can move in the virtual reality world and even fly around to explore, meet people, engage in text chat, etc. To simplify the navigation process, an avatar may also be teleported directly to a specific location in the virtual reality world. When an avatar representing a different person is in the view, this person/avatar can be selected to start a conversation (e.g., text chat).

An avatar includes an image that represents a user. The appearance of an avatar may or may not resemble the user. An avatar may be in the shape of a human being, a cartoon character, or other objects. An avatar may be based on one or more photographs of the user. For example, a photo image of a user may be mapped to generate an avatar that simulates the look and feel of the user. Alternatively, an avatar may not have any resemblance with the actual appearance of the user, to allow the user a complete different virtual life in a virtual community.

U.S. Pat. App. Pub. No. 2008/0262910, entitled "Methods and Systems to Connect People via Virtual Reality for Real Time Communications", discloses a virtual reality environment in which users in real world can be connected for real time communication via virtual telephones provided in the virtual reality environment. The virtual reality environment may include virtual objects, such as a virtual computer, a virtual bulletin board, a virtual magazine or newspaper, a virtual book, a virtual television, a virtual robot, to provide advertisements.

U.S. Pat. App. Pub. No. 2016/0026253, entitled "Methods and Systems for Creating Virtual and Augmented Reality", discloses an augmented reality (AR) system that may render a virtual television that could even extend beyond the confines of the physical room. The AR system also renders media content, such as television programs, movies, video conference or calls, to appear as if the media content was being displayed by the virtual television. The AR system can also render an experience that a user is sitting in a virtual theater and seeing those sitting around and/or in front of the user.

The entire disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Systems, methods and computer program products are provided. In the detailed description herein, references to "various embodiments," "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Figure 1:
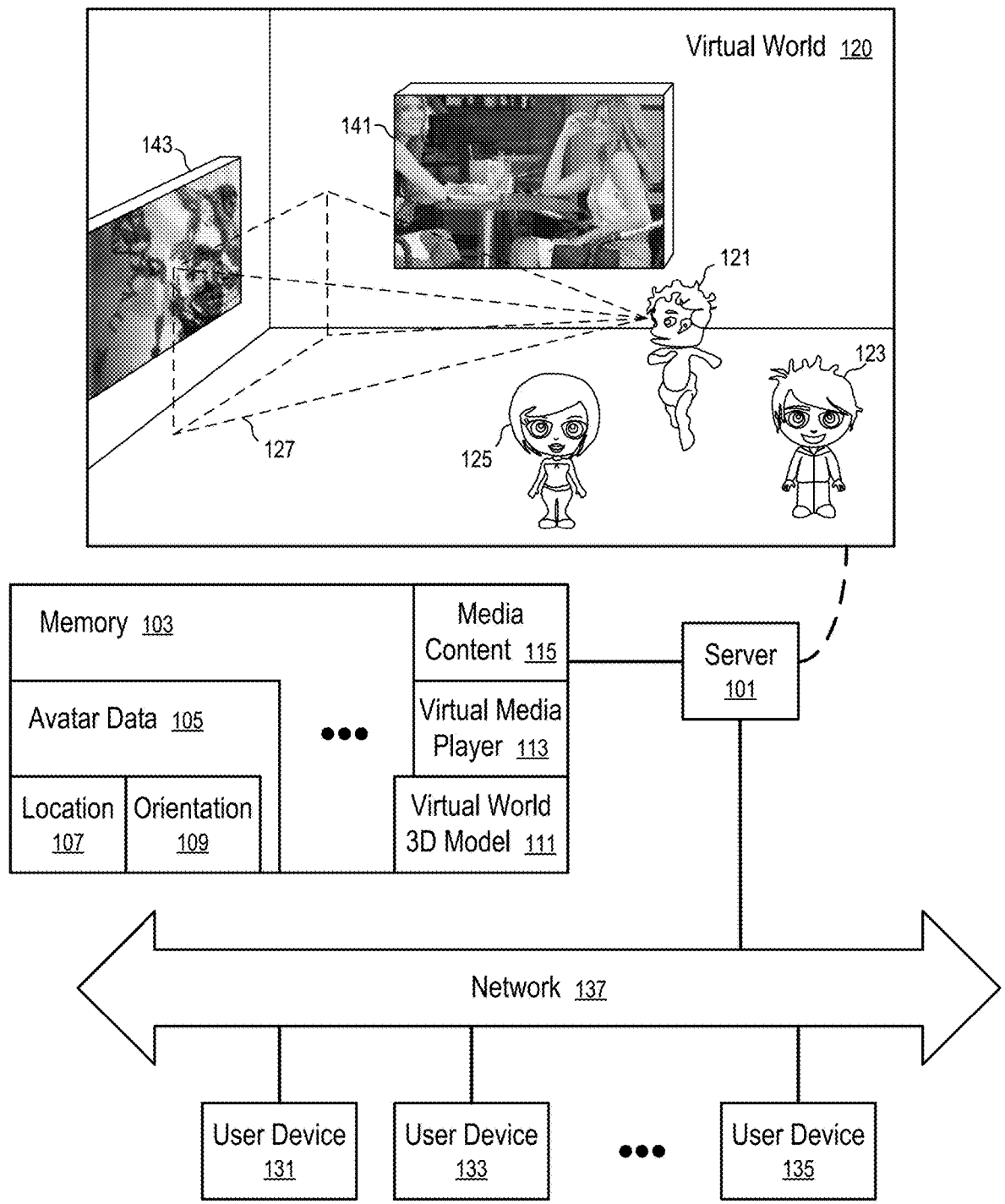
FIG. 1 shows a system configured to present media content via a virtual world according to one embodiment.

FIG. 1 shows a system configured to present media content via a virtual world according to one embodiment.

In FIG. 1, a computer system includes a server (101) and memory (103). The system is configured to construct a virtual world (120) using the data stored in the memory (103).

In FIG. 1, the memory (103) stores the 3D model (111) of the virtual world (120) that including virtual objects (e.g., 141, 143) and avatars (e.g., 121, 123, ..., 125), etc.

In FIG. 1, the memory (103) stores avatar data (105) that specify the look and feel of avatars (e.g., 121, 123, 125) in the virtual world (120). Each of the avatars (e.g., 121, 123, ..., 125) is a representation of a corresponding user operating a corresponding one of user devices (131, 133, ..., 135) that are connected to the server (101) via a network (137). The appearance of an avatar (e.g., 121, 123, ..., 125) may be a 3D model of a virtual being having no resemblance to the corresponding user, or be constructed based on a photo/video image of the user. For example, a user of the user device (133) may use a camera to capture video images containing the face and/or body/clothing of the user; the user device (133) transmits the video images to the server to cause the server (101) to map the images of the face and/or body/clothing of the user from the video images to the face and/or body of the corresponding avatar (123), such that the facial and/or body expressions of the user can be shown in real time in the virtual world as the facial and/or body expressions of the avatar (123).

For each of the avatars (e.g., 121, 123, ..., 125), such as the avatar (121), the memory (103) of the server (101) stores data identifying the location (107) of the avatar (121) in the virtual world (120) relative to the virtual objects (e.g., 141, 143), and orientation (109) of the avatar (121) in the virtual world (120) relative to the virtual objects (e.g., 141, 143). For example, the user devices (131, 133, ..., 135) are configured with input devices to generate input data based on the movements of the users of the user devices (131, 133, ..., 135), such as head movements, body movements, eye movements. The input data is transmitted from the user devices (131, 133, ..., 135) to the server (101) to adjust the location (107) and/or the orientation (109) of the avatar (121) and/or the post of the avatar (121).

Based on the location (107) and the orientation (109) of the avatar (121) in the virtual world (120), the server (101) computes the field of view (127) of the avatar (121) and generates a scene as seen from the eyes of the avatar (121). An image representation of the scene is extracted from the 3D model (111) of the virtual world (120) and transmitted from the server (101) to the user device (e.g., 131) controlling the avatar (121) for displaying on a display device of the user device (e.g., 131).

In general, different user devices (e.g., 131, 133, ..., 135) obtain different scenes of the virtual world (120) as seen from the eyes of their respective avatars (e.g., 121, 123, ..., 125).

In FIG. 1, the virtual objects in the virtual world (120) include virtual display devices (e.g., 141, 143). The virtual display devices can be configured to have the look and feel of real display devices, such as a television set, a theater screen, a computer monitor, etc.

In FIG. 1, the memory (103) stores media content (115), such as a video, a movie, a television program, etc., that can be presented on user devices (131).

Instead of playing back the media content (115) in a full screen mode on a screen of a display device of the user device (131), or a predetermined window on the screen, the system as illustrated in FIG. 1 is configured to virtually play the media content (115) in a virtual display device (e.g., 143) that is captured in the scene as seen by the avatar (121) of the user device (131) in the virtual world (120) and presented on the physical display device of the user device (131), as if the media content (115) were played back on the virtual display device (e.g., 143) and seen by the respective avatar (121).

For example, in one embodiment, the virtual media player (113) plays back the media content (115) on the virtual display device (143) to change the look and feel of the virtual display device (143). The server (101) captures the scene of the virtual world (120) from the field of view (127) of the avatar (121) and generates a video stream for presenting the scene as a video on the user device (131) that includes the change of the look and feel of the virtual display device (143) during the playing back of the media content (115) on the virtual display device (143).

For example, when a new image frame from the media content is played back by the virtual media player (113), the image content of the frame is extracted by the virtual media player (113) from the media content (115) and overlaid on the virtual display device (143) to update the 3D model (111) of the virtual world (120); and the updated scene of the updated virtual world (120) as seen by the avatar (121) is computed and transmitted to the user device (131) for display.

Alternatively, when a new image frame from the media content (115) is played by the virtual media player (113), the image content of the frame is extracted by the virtual media player (113) from the media content (115) and transmitted to the user device (131) to cause the user device (131) to map the image content onto the area where the virtual display device (143) is shown on the physical display device of the user device (131).

Alternatively, the virtual media player (113) streams the media content (115) from the server (101) to the user device (131) without decoding the media content (115) into frames of images. The scene captured and transmitted from the server (101) to the user device (131), according to the field of view (127) of the avatar (121), includes data identifying the location and shape of the virtual display device (143) within the scene. The user device is configured to decode the media content (115) into frames of images and map the images onto the area of the real display device of the user device (131) corresponding with the virtual display device (143) shown in the scene. When the virtual display device (143) as seen by the avatar (121) is distorted in the field of view (127), frames of images extracted/decoded from the stream of the media content (115) are transformed accordingly to match the distortion of the virtual display device (143) as presented on the user device (131). When the virtual display device (143) is only partially visible in the scene as seen in the field of view (127) of the avatar (121), the media content (115) is clipped to present the portion that would be shown on the visible portion of the virtual display device (143) in the scene.

The virtual media player (113) may virtually play back the media content (115) on the virtual display device (143) such that any avatar (e.g., 121, 123, . . . , 125) looking at the same virtual display device (143) watches the same media content.

Alternatively, different avatars (e.g., 121, 123, . . . , 125) may choose to watch different media content on the same virtual display device (143) at the same time. For example, a first avatar (121) controlled by a first user device (131) may choose to watch a first video on demand on the virtual display device (143), while a second avatar (125) controlled by a second user device (135) is consuming a second video on demand via the same virtual display device (143).

In FIG. 1, the user of the user device (131) may invite a friend using another user device (133) to join and share the viewing experience of the media content (115) presented via the virtual display device (143) in the virtual world (120). When the friend accepts the invitation using an input device of the friend user device (133), the friend avatar (123) of the friend user device (133) is teleported to the vicinity of the avatar (121) of the user device (131); and the same media content (115) is streamed, concurrently and in synchronization, to the user device (131) and the friend user device (133), for display in the virtual display device (143) (or portions of the virtual display device (143)) in the respective scenes as seen from the eyes of the respective avatars (121 and 123).

In one embodiment, the server (101) further provides a real time communication channel for voice communications between the user of the user device (131) and the friend using the friend user device (131). Thus, the user and the friend can share the experience of viewing of the media content in the setting of the virtual world (120) and communicate with each other verbally during the shared viewing session.

Optionally, the server (101) further provides a user interface that allows an avatar (121) to request a communication connection with another avatar (125) in its field of view (127) for real time communications, such as voice communications and/or instant message communications.

For example, the server (101) may optionally render visible to the avatar (121) other avatars (e.g., 125) that are currently watching the same media content (115) as the avatar (121) on the same virtual display device (143), allowing the avatar (121) to request a communication connection with other avatars (e.g., 125) selected by the avatar (121).

The server (101) may optionally render other avatars (e.g., 125) not currently watching any media content (115) on the virtual display device (143) visible to the avatar (121), allowing the avatar (121) to request a communication connection with such avatars (e.g., 125) selected by the avatar (121) and/or invite the respective avatars (e.g., 125) to join the viewing experience of the avatar (121).

Optionally, the server (101) may render some avatars invisible to the avatar (121) when the invisible avatars are watching on the virtual display device (143) media content different from what the avatar (121) is watching.

In one embodiment, the server (101) generates an audio stream based on what the ears of the avatar (121) could hear in the virtual world (120) from the audio sources in the virtual world (120). The audio sources can be selected for the ears of the avatar (121) based on the distances between the audio sources and the avatar (121); the sound levels of the audio sources can be adjusted according to the distances between the audio sources and the avatar (121); and further, a stereo audio stream can be customized based on the direction of the audio sources relative to the ears of the avatar (121).

Optionally, the server (101) further mixes into the audio stream the voice communications from friend user devices (e.g., 133, . . . , 135) that are connected with the user device (131) for real time communications and the shared session of consuming the media content (115). The server (101) of one embodiment further provides real time language translation for the voice communications among the users.

Alternatively, the audio stream(s) and voice communications are transmitted separate from the server (101) and the respective user devices (e.g., 133, 135) to the user device (131), which combines the audio stream(s) and voice communications for the user of the user device (131).

Figure 4:
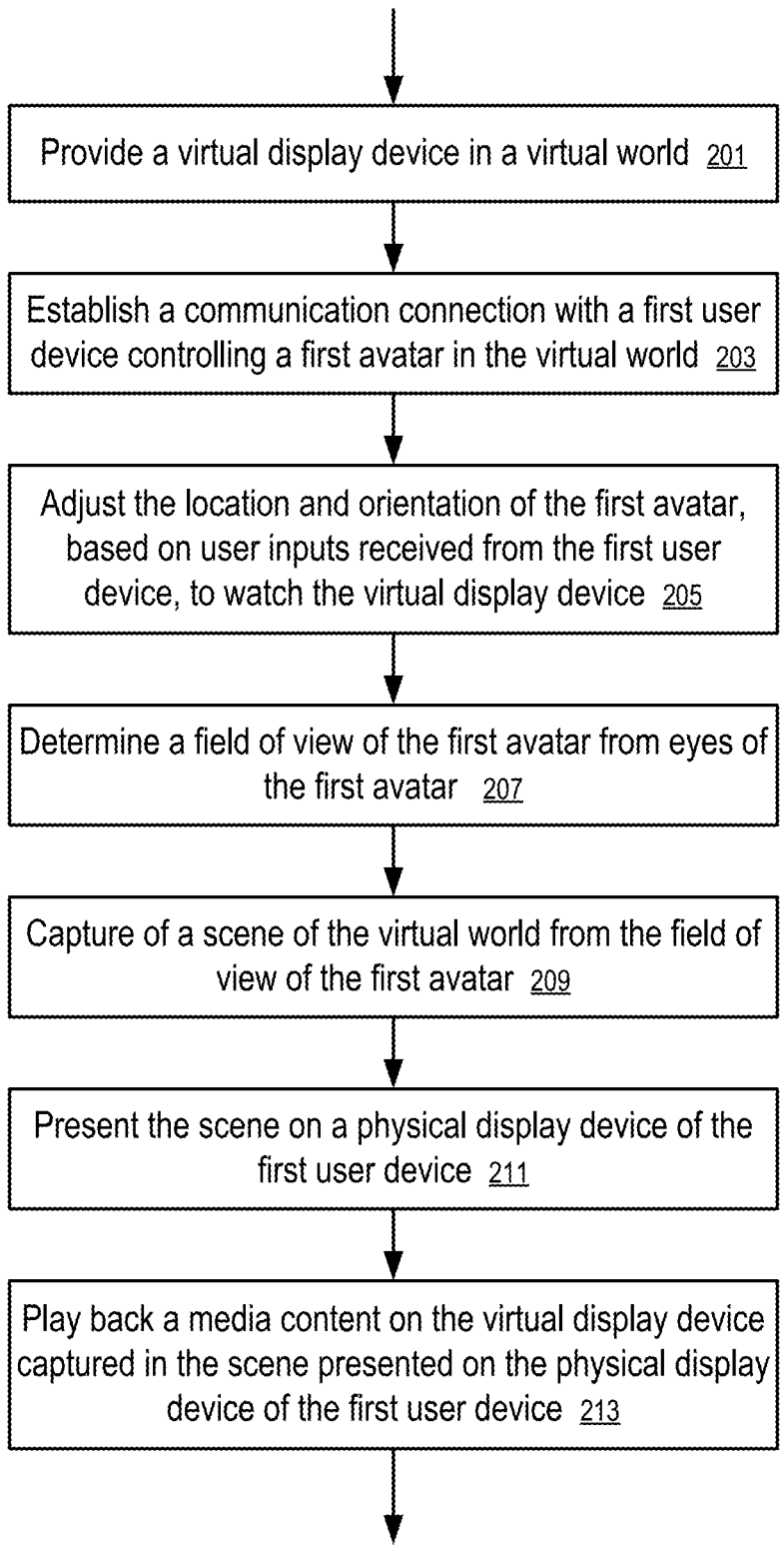
FIG. 4 shows a method to present media content according to one embodiment.

FIG. 4 shows a method to present media content according to one embodiment. For example, the method of FIG. 4 can be implemented in the system illustrated in FIG. 1.

In FIG. 4, a computing system is configured to: provide (201) a virtual display device (143) in a virtual world (120) hosted on a server (101); establish (203) a communication connection between the server (101) and a first user device (e.g., 131) controlling a first avatar (121) in the virtual world (120); adjust (205) the location (107) and orientation (109) of the first avatar (121), based on user inputs received from the first user device (131), to cause the eyes of the avatar (121) to watch the virtual display device (143) in the virtual world (120); determine (207) a field of view (127) of the first avatar (121) from eyes of the first avatar (121); capture (209) of a scene of the virtual world (120) from the field of view (127) of the first avatar (121); present (211) the scene on a physical display device (147) of the first user device (131) in the real world; and play (213) back a media content (115) on the virtual display device (143) captured in the scene and presented on the physical display device (147) of the first user device (131).

Figure 5:
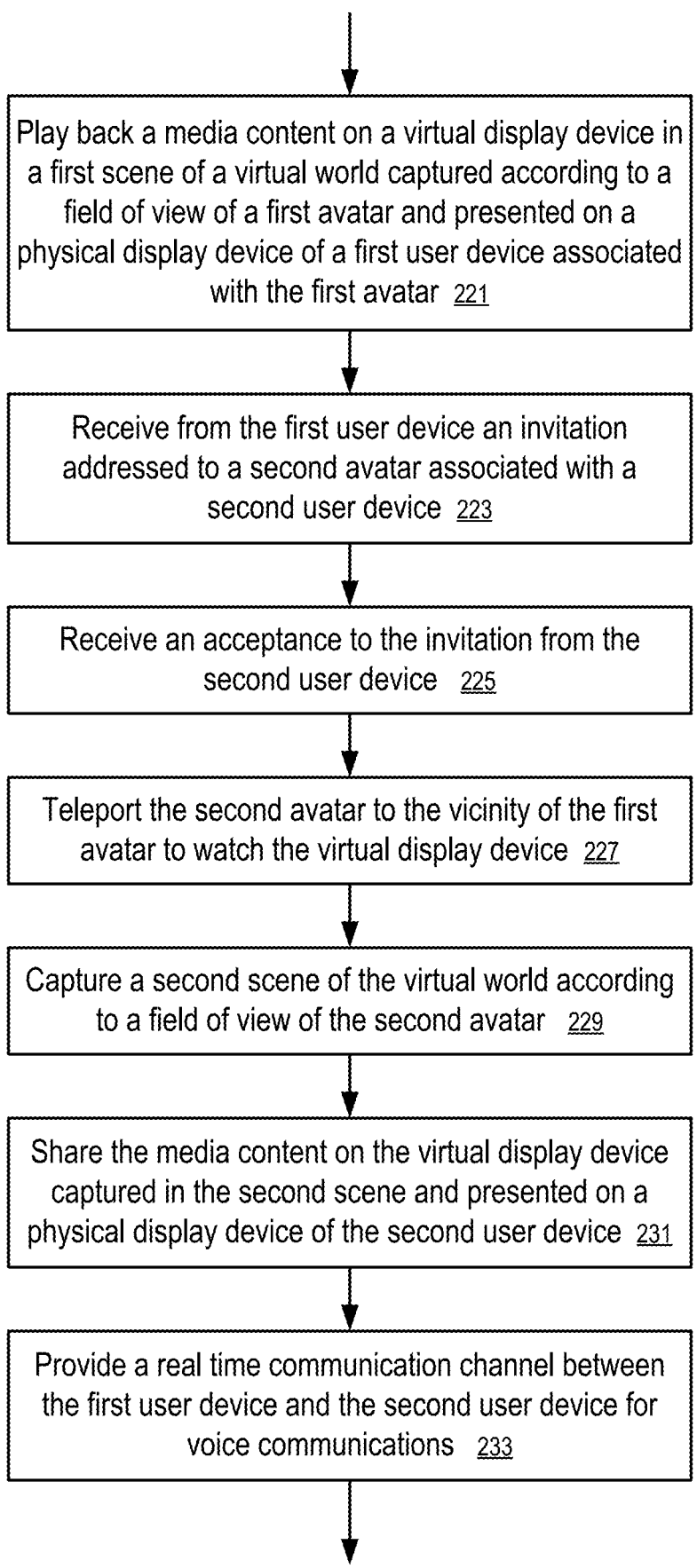
FIG. 5 shows a method to share media content according to one embodiment.

FIG. 5 shows a method to share media content according to one embodiment. For example, the method of FIG. 5 can be implemented in the system illustrated in FIG. 1. The method of FIG. 5 can be optionally combined with the method of FIG. 4.

In FIG. 5, a media content (115) is played back on a virtual display device (143) in a first scene of a virtual world (120) captured according to a field of view (127) of a first avatar (121) and presented on a physical display device (147) of a first user device (131) associated with the first avatar (121), e.g., in a way as illustrated in FIG. 4 and/or discussed in connection with FIG. 1.

In FIG. 5, the computer system is further configured to: receive (223) from the first user device (131) an invitation addressed to a second avatar (123) associated with a second user device (133); receive (225) an acceptance to the invitation from the second user device (133); teleport (227) the second avatar (123) to the vicinity of the first avatar (121) to cause the second avatar (123) to watch the virtual display device (143) in the virtual world (120); capture (229) a second scene of the virtual world (120) according to a field of view of the second avatar (123); share (231) the media content (115) on the virtual display device (143) captured in the second scene and presented on a physical display device of the second user device (133); and provide (233) a real time communication channel between the first user device (131) and the second user device (133) for voice communications between the users of the first user device (131) and the second user device (133). Thus, the users of the first user device (131) and the second user device (133) can virtually share the media content in the setting of the virtual world (120) in close proximity while using their respective user devices (131 and 133) that may be remote to each other in the real world.

In one embodiment, the memory (103) coupled with the server (101) having at least one microprocessor (173) stores instructions that when executed by the at least one microprocessor (173), cause the server (101) to: provide a virtual world (120) having at least one virtual display device (143); establish a communication connection between the server (101) and a user device (131) associated with an avatar (121); provide the avatar (121) in vicinity of the virtual display device (143) in the virtual world (120); adjust a location (107) of the avatar (109) and an orientation (109) of the avatar (121) based on input received in the user device (131) and communicated to the server via the communication connection (e.g., made using the computer network (137)); determine a field of view (127) of the avatar (121) from eyes of the avatar (121); capture a scene of the virtual world (120) as seen by the avatar (121) from the field of view (127), where the scene includes at least a portion of the virtual display device (143) located in the virtual world (120); and communicate, via the communication connection to the user device (131), the scene captured from the virtual world (120) and communicated to the user device (131) to cause the user device (131) to display the scene with a video content (115) that is associated with the virtual display device (143), where the video content (143) is presented in the scene on the user device (131) within the portion of the virtual display device (143).

The video content is presented within the scene in a way corresponding to playing back the video content in the virtual world in the virtual display.

For example, a video stream of the scene is transmitted from the server (101) to the user device (131); and the video stream includes the video content overlaid on the portion of the virtual display device.

For example, the server (101) of one embodiment streams the video content to the user device (131) and instructs the user device (131) to overlay the video content on the portion of the virtual display device (143) that is displayed on the user device (131).

For example, the server (101) or the user device (131) is configured to clip the video content according to the size of the portion of the virtual display device visible in the scene presented on the user device (131), and transform the video content according to an orientation of the virtual display device (143) in the scene for mapping/overlaying onto the portion of the virtual display device shown on the user device (131).

Optionally, the server (101) generates an audio stream from one or more audio sources in the virtual world (120) based on distances from the one or more audio sources to ears of the avatar (121). The audio stream may include a stereo stream of audio corresponding sounds from the one or more audio sources in the virtual world (120) as being heard at the ears of the avatar (121). Further, in response to user requests, the server (101) causes user devices (131) to establish real time communication connections for voice communications among the users of the user devices (131, 133, . . . , 135) connected to the server (101). The server (101) may mix the voice communications into the audio streams generated from the virtual world (120) and delivered to respective user devices (131, 133, . . . , 135).

Further, the server (101) may perform real time translation from one language to another to facilitate voice communications between users of the user devices (131, 133, . . . , 135) who use different languages. For example, the server (101) receives, from the user device (133) controlling the avatar (123), voice input in a first language, translates the voice input into a voice communication in a second language used by the user of the user device (131) controlling the avatar (121), and generates an audio stream from audio sources in the virtual world (120) based on distances from the audio sources to ears of the avatar (121), using audio data from the audio sources in the virtual world (120), including audio of the media content (115) virtually played on the virtual display device (143) for the avatar (121) and the voice communication in the second language, translated from the voice input of the avatar (123), as heard in the ears of the avatar (131) in the virtual world (120). The audio stream is provided to the user device (131) to generate audio output using the audio device (149) of the user device (131) in the real world.

Optionally, the server (101) receives an image of a user of the user device (131) captured by a camera (143) of the user device (131) and customizes and presents the avatar (121) controlled by the user device (131) in the fields of views of other avatars (e.g., 123, 125) using the image.

The user device (131) may include a sensor (153) of a movement of a hand of the user of the user device (131); and the location (107) of the corresponding avatar (121) is adjusted based on the movement of the hand of the user detected by the sensor (153). The sensor (153) may be mounted on the hand of the user and configured to determine a relative motion between the hand and a display device (147) of the user device (131) that is mapped to the distance between the virtual display device (143) and the avatar (121). For example, when the sensor (153) is in the mode to control the location of the avatar (121), the sensor (153) determines the movement of the hand of the user relative to the display device (147); and servers (101) maps the hand movement to the movement of the avatar (121) in the virtual world (120) relative to the virtual display device (143). The movement of the avatar (121) can also be controlled by sensors configured to detect the head movements, eye movements, body movements, etc. The movement of the avatar (121) changes the location (107), the orientation (109), and/or the body post of the avatar (121) in the virtual world (120).

Figure 2:
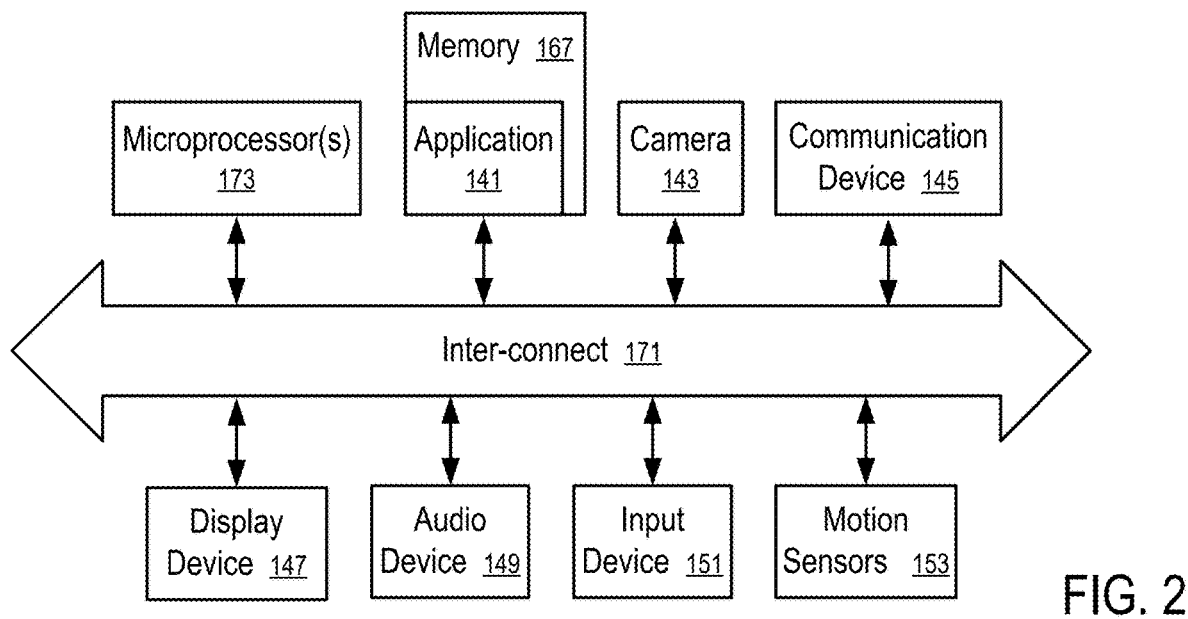
FIG. 2 shows a user device configured to play media content according to one embodiment.

FIG. 2 shows a user device configured to play media content according to one embodiment. For example, the user device as illustrated in FIG. 2 can be used to implement any of the users devices (131, 133, . . . , 135) shown in FIG. 1, with more or less components as illustrated in FIG. 2.

In FIG. 2, the user device includes an inter-connect (171) (e.g., bus and system core logic), which interconnects a microprocessor(s) (173) and memory (167) storing an application (141) configured to perform operations to play the media content (115) in the context of the virtual world (120) in a way discussed in connection with FIG. 1.

In FIG. 2, the inter-connect (171) interconnects the microprocessor(s) (173) and the memory (167) together and also interconnects them to optional components, such as a camera (143), a communication device (145), a display device, (147), an audio device (149), motion sensors (153), and one or more input devices (151), such as mice, keyboards, touch pads, data glove, etc. The motion sensors (153) detect the body motions, head motions, and/or eye motions of the user of the user device. In some embodiments, the motions can also be detected at least in part via the camera (143). The application (141) is configured to convert the input signals from the input device (151) and/or motion sensors (153) into control signals for the corresponding avatar (e.g., 121) in the virtual world (120). Further, the camera (143) can be used by the application (141) to capture the real time facial images of the user and transmits the facial images to the server (101) for mapping onto the face of the avatar (121) such that friends joining the viewing session of the user using other avatars may see the facial expressions of the user via watching the avatar (121) in the virtual world (120). The communication device (145) is controlled by the application (141) to communicate with the server (101) to receive the scene as seen by the avatar (121), and communicate the control signals for the avatar (121) to the server (101). The application (141) is configured to present on the display device (147) the scene with the media content mapped into the virtual display device (143) in the scene captured according to the field of view (127) of the avatar (121). The application is configured to use the audio device to play the audio stream from the media content, other audio sources in the virtual world, and/or the voice communications from other user devices connected for real time communications.

Figure 3:
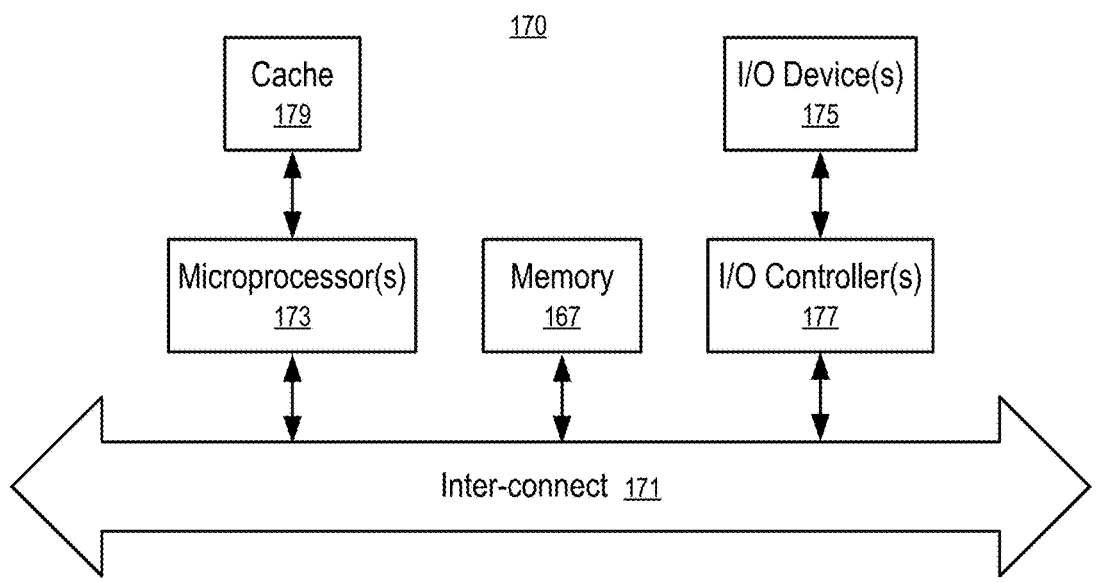
FIG. 3 shows a data processing system configured to implement a virtual world according to one embodiment.

FIG. 3 shows a data processing system configured to implement a virtual world according to one embodiment. For example, one or more of the data processing systems can be used to implement the computer system having the server (101) and the memory (103), with more or less components as illustrated in FIG. 3.

While FIG. 3 illustrates various components of a computer system, it is not intended to represent any particular architecture or manner of interconnecting the components. One embodiment may use other systems that have fewer or more components than those shown in FIG. 3.

In FIG. 3, the data processing system (170) includes an inter-connect (171) (e.g., bus and system core logic), which interconnects a microprocessor(s) (173) and memory (167). The microprocessor (173) is coupled to cache memory (179) in the example of FIG. 3.

In FIG. 3, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

A virtual world (120), according to various embodiments may include a composition of entertainment centers within a virtual CineAvenue. The virtual world may be provided via a computing device projecting virtual participants within a virtual reality world, wherein entertainment exhibitions, movies, shows, trailers, CineCouture, CineFestivals, CineCities, CineDestinations, etc. may be viewed by subscribers/participants. Such participants may also be able to meet, chat and interact within this virtual world.

The subscriber/participant may include any viewer who chooses to enter CineWorld. Registration may be required. The viewer may choose an avatar already placed within CineAvenue, or a projected video image of the viewer, a selfie, that the viewer records and projects into CineWorld, by a computing device, controlled by the viewer.

In one embodiment, a CineWorld is an ever changing audio-visual world that harbors many entertainment, couture, and other international lifestyle venues that entice subscribers into an encompassing virtual life, that triggers conversations, connections, ideas, taste, cuisine, art and films; an ever transforming world of art and entertainment, and trigger to a millennial buzz that encompasses an enlarged demographic. CineWorld provides an alternative social virtual life, where a user can be whatever the user wishes to be by picking an avatar to represent the alter ego of the user, from images of movie stars to images of the real user. Projected onto CineAvenue, a viewer can live an alternative life where the user can mingle with the stars and with friends. The viewer can chat with any of the other avatars, enjoy a movie together or even a virtual meal in the 5 star restaurants down the street. Avatars can meet each other walking down the street and exchange information. Avatars can tweet or invite friends to join them at CineWorld, much like connecting with friends on social media chat rooms. Viewers may enjoy shopping in CineCloset, where designers display creations and avatars can mix and match, with the help of designers and stylist. If it looks good on the user, it can be bought in real life, by simply placing the cursor on an item and an identifier of the avatar. Organic advertising is displayed on CineAvenue, with neon lights flashing brand names, electronic billboards, and theatrical spots. Within the stores are products for avatars to enjoy. After a registration process, the viewer becomes a member, given access to the shows and venues. Avatars can invite a friend from across the country or the globe within the virtual world for a movie date or to virtually wine and dine.

Visual and audio perceptions are provided via the eyes and ears, respectively, of the avatar. Avatars may be the recipients of the audio visual exhibition of the environment, the virtual objects and any content that is projected on the multiple screens within the multiple venues that the avatars are able to visit, see and transmit onto the viewer's computer screen.

Multiple avatars may be able to view the same Audio Visual exhibitions, chat and meet other avatars during such experience, by one or more computing devices that present the exhibition and provides a cue perceivable to one or more avatars participating within this virtual reality located in the vicinity of the exhibition. Audio Visual experiences within the virtual world can appear to be an intimate shared experience between the viewer's avatar, and one or more friends/residents, yet the exhibition can be experienced in the same intimate way with a large number of viewers.

For example: a theatre can accommodate hundreds of resident/participants while in real life, but in the virtual reality environment, millions can watch the same movie or other exhibition. In some exemplary embodiments, the exhibition can be provided as a video on demand (VOD) whereby a viewer can share the movie, show or sports event with friends and chat with them in the arena of exhibition. Any number of different viewers can watch the same exhibition, and such viewers can chat amongst themselves while the exhibition is in process. Among other things, embodiments of the present disclosure thus help to enhance a shared experience between friends.

Within CineWorld the participants/subscribers are able to receive a visual cue on the actual/virtual exhibition. The exhibition is visible to the plurality of positions of the avatars. The cue may also include an audio cue, which is delivered to the subscribers/participants avatars who are in a predetermined distance from the source of the exhibition, within the virtual world. Audio cues can be sent and received from avatar to avatar, as well as from the viewer to the avatar and to other residents within the virtual world. Communication can occur in any language and instantly translated to the desired language of the listener.

CineWorld comprises a 3D perspective in reference to virtual vicinities, venues and objects including the avatars themselves. A live experience within a virtual 3D CineWorld. Adding background lighting to enhance the distance between the virtual objects, the avatars and the virtual residents in the virtual vicinity, to the Back Ground, simulates with a computing device a 3D perspective. Such 3D environment can also be enhanced with a computing device by creating visual depth, mirroring real life distances between an object and its background, creating a geometric corresponding equation for a 3D perspective in the virtual reality.

As CineWorld is an experiential city, or other entertainment arenas, advertising is organically presented as Virtual Billboards, Electronic Billboards, Virtual Neon lights, Virtual Branded buildings etc., which help add excitement to the experiential environments. Brand exposure and positioning is negotiated and decided upon based on an advertising scale offered to the brands. Products such as fashion or cars etc. can be introduced regularly within CineAvenue. Advertisements can also be exhibited during the previews prior to the scheduled theatrical live movies, shows etc. CineCouture includes a virtual live exhibition of fashion weeks from around the world, and in a more intimate vicinity, CineCloset which is a venue created to allow fashion brands to exhibit their garments. Stylists and designers alternate in styling the avatars that wish to be styled in CineCloset. Once the avatar is dressed, the viewer can place the cursor on the garment and purchase the garment in real life.

Within CineWorld, several virtual theaters can be bought or leased by other studios and networks to exhibit films, trailers, shows etc. in an effort to promote the content to subscribers or to attract the subscribers to the various real life locations either to the Theatrical screen, Television screens, or internet channels who are promoting a series, movies or other shows.

CineWorld allows the viewer to travel to desired destinations by simply requesting a specific city, or tourist attraction placed into the search engine. The avatar will be traveling on the screen to such location and be able to experience any city across the world in CineWorld.

Upon entering CineWorld the viewer experiences the screen moving towards the viewer, which allows for a feeling of movement within CineCities or CineDestinations. Virtual Objects are changing in perspective as the avatar passes by them to move to a specific POI (Point of Interest) within the virtual world. The viewer's body, hand, head and eye movements in the real world can be sensed, captured and tracked by motion capture devices and sensors and such movements can be visualized on the screen in the form of the viewer's avatar. The viewer's body, head, hand and eye movements captured in the real world may also allow the viewer to move down a CineAvenue on the screen, which allows for a feeling of movement within CineCities as objects on the screen get larger and move towards the viewer as the avatar gets closer to them.

The viewer/subscriber can control the movement of his or her avatar or objects within the CineWorld virtual environment in any desired manner. In some exemplary embodiments, as introduced above, a user can control movement and/or objects by pointing a finger or by moving a hand towards the computer screen, that causes a mirror like duplication of movement via a sensory computing device that can direct the movement of the avatar objects in any direction, to perform a command that results in action within the virtual world. Such movement can also be performed by placing the cursor on the avatar or object to trigger action.

CineCuisine is a Virtual Restaurant within CineWorld, wherein, a major chef avatar offers a menu of his cuisine creation to avatars that have made a reservation. The dinning avatars are residents of CineWorld even if their real life locations are on opposite sides of the planet, e.g., China and Canada. Chatting and vocal communications while dinning is made possible via a computing device that is controlled by the subscribers.

The CineWorld virtual environment can include a virtual world of points of interest. Arenas, cities, specific streets, entertainment centers and places of geographic significance can be created and immersed into the virtual world. CineWorld invites it's visiting avatars to specific geographic destinations created and immersed into the virtual world either by acquisition from the unity assets available from the stores or created for specific immersion into the world. The CineWorld not only provides audio/visual entertainment, but also e-commerce within the virtual world and virtual tourism in the virtual world. A choice menu is instantly available for the visiting avatars to choose from a menu of locations which include POI destinations such as: New York, Paris, Hong Kong, Wall Street, Fashions Weeks, the Metropolitan Museum, etc., as well as entertainment venues such as: Broadway Theaters, Vintage and Modern Movie Theaters, Boutiques, Department Stores, Concert Arenas, Clubs, etc. Resident avatars are created and mobilized to guide the visiting avatars to their designed destinations, ranging from POI (Points of Interest) to ecommerce stores, concerts, movies, live performances, Broadway productions etc. The resident avatars can be used as live direction indicators, enabling vocal and text directions as well as a menu advertising POIs, as well as programming and e-commerce venues available within the virtual entertainment world. Resident Vehicles designed as virtual taxis are available within the virtual world, equipped with Vocal/sound capability and direction menu, that materializes as the visiting avatar approaches. Selections can be activated by vocal command and/or touch command.

One exemplary embodiment includes displaying, by a computing device, a virtual object inside a virtual world, wherein the virtual object is visible to residents/subscribers of the virtual reality world, when the residents are in the vicinity of the virtual objects. The existence of the virtual objects and avatars may be independent of any resident/subscribers of the virtual reality world of CineWorld.

In one embodiment, a call may be directed for a real time communication session, wherein the call is directed at the virtual object or avatar. In response to the call, a presentation of a virtual object may be changed, by a computing device, to provide a cue perceivable to the residents/subscribers in the virtual world in the vicinity of the virtual object, where the cue indicates that the call is being directed at the virtual object/avatar. Input from a resident located in the vicinity of the virtual object in the virtual world may be received via the computing device, and in response to the input received from the resident, the call directed at the virtual object to the resident may be connected for a real time communication session.

Embodiments of this disclosure may include a live three-dimensional (3D) screen. The screen may be presented in a forward motion towards the real life viewer. The virtual car, and virtual avatars as well as virtual avatar/selfies may move independently in a 360 degrees capacity, revealing new virtual vicinities and virtual objects as turning corners occur within the virtual world. Movement within CineWorld allows for 3D mobility.

The viewer in real life can direct, communicate, and instruct one or more resident avatars to move, chat, listen, watch and react in the virtual world by several methods: vocal communication, text communication, moving a virtual object or an avatar via the cursor, visual cues via a computer device or audio cue by computer device or device coding and instructions to the surrounding environment in the virtual world.

Exhibitions can be viewed by real life demand at any time the resident in the virtual world desires.

Ticket purchases can occur via the avatar in the virtual reality from the ticket box office, in any of the virtual arenas in CineWorld, such as Movie theatres, Broadway live theatres, Las Vegas shows, Global experiential events etc. Such purchases can be made via vocal communication, via text communication, real life viewer movements, instruction etc.

The residents can shop in a virtual shopping mall, or shop on famous streets such as a virtual Rodeo Dr. or in a virtual department store. Purchases can be made by the real life viewer by placing a cursor on the item of interest and buying the item in real life. Purchases can also be made by the real life viewer by certain body, hand, head or eye movements with reference to the item of interest on the screen. The item will be shipped to viewer's address in the same fashion as on line shopping.

Embodiments of the present disclosure may provide various audio-visual communication connections to provide real time communications and other functionality within the virtual environment.

In various embodiments, virtual reality may be used to create a virtual world for virtual residents viewing real life exhibitions within virtual 3D venues. A data processing system or other computing device(s) may be used to simulate and provide an environment for the user to interact and perform operations on the simulated system, and receive various types of feedback in real time (including video and audio), as well as to present a virtual world primarily providing experiences, displayed on a computer screen.

A 3D system can be simulated such that the experience of the user in real time can provide additional sensory experiences beyond visual such as enhanced and personalized sound, touch etc. Embodiments of the present disclosure may provide a virtual reality world that can offer user immersion, navigation, and manipulation. The virtual reality environment can make the users feel that they are present in the simulated world, a sensation referred to as engagement or immersion.

In some exemplary embodiments, CineWorld, a virtual reality environment, supports a multiplayer online role playing game, in which a user represented by an avatar can interact with other users who are also represented by their corresponding avatars, controlled by an input device such as a mobile device, or a key board, a remote communication device, or a vocal communication device—an avatar can move in the virtual reality world, drive, and even fly around to explore, meet other residents in the virtual world, engage in chats, text or via vocal communication, engage in dancing, athletics activities and other movements.

Elements of the virtual reality world may be presented via various computing devices, including laptops, personal computers, tablet computers, smart phones, and the like. An avatar may also be teleported directly to specific vicinity in CineWorld. When an avatar representing a different viewer is in view, this avatar can be selected to start a chat (via text or vocal communication).

An avatar presents an image chosen by the user. The appearance of the avatar may or may not be that of the user. The avatar may be chosen from vintage movie stars, sports figures, icons, visual computer graphic photographic images of people etc. Either a photo image of the user (e.g., a still selfie), or a video. A selfie, may be mapped to generate an avatar that mirrors the look and feel of the user. Allowing the user a complete different virtual life in a virtual community.

The user may wish to pick a different image other than a selfie, which could be an image of a movie star or another image of a person of choice, either a photographic image or a video image. Such an image can be projected into the virtual world and become a resident of the virtual world.

To register as a member of CineWorld a user may choose an avatar image and fill in the application on line. The virtual world may include a virtual currency to support the chosen activities. Multiple venues in the virtual world provide sought after exhibitions, or places of importance that require virtual currency in order to trigger the desired exhibition or service. Other services may be offered to the residents that require payment with the virtual currency. The virtual currency may or may not be exchangeable with real world currency.

There may be permanent avatars/residents within the virtual world of CineWorld, such as the hospitality population. Those are the avatars that are visible behind the virtual counters at points of purchase. A computer device may activate Hospitality avatars into service mode. Wireless communication from the users into the virtual world can be done via voice activation cues or SMS, MMS, etc.

CineWorld provides a multimedia organic advertising platform designed to reach globally populated web users via the following exemplary methods: neon lights advertising: visible on virtual landmark buildings, adds to the experiential environment within CineAvenue. Making the advertising organic; billboards: multi colored, placed in prominent vicinities and sized according to the advertisers budget, enhance the excitement within the CineAvenue environment and allow for organic non-alienating advertising—size and location is dependent on advertising budgets; electronic billboards: can be placed in strategic location, against the black and white vintage buildings prevalent within the environment of CineWorld to further expand the experiential atmosphere; performance: performance based advertising where an advertiser pays only for a measurable event that is a direct result of advertisements being viewed or heard by consumers.

Audio Visual exhibitions within the virtual world of CineWorld, allow for commercials before Movies and other shows that are exhibited within the theatres and other venues within the virtual world of CineWorld.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: shipping data, package data, and/or any data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers. A user may include any individual, business, entity, government organization, software component and/or hardware component that interacts with a system.

Various functionality may be performed via a web browser and/or application interfacing utilizing a web browser. Such browser applications may comprise Internet browsing software installed within a computing unit or a system to perform various functions. These computing units or systems may take the form of a computer or set of computers, and any type of computing device or systems may be used, including laptops, notebooks, tablets, hand held computers, personal digital assistants, set-top boxes, workstations, computer-servers, main frame computers, mini-computers, PC servers, pervasive computers, network sets of computers, personal computers and tablet computers, such as iPads, iMACs, and MacBooks, kiosks, terminals, point of sale (POS) devices and/or terminals, televisions, or any other device capable of receiving data over a network. Various embodiments may utilize Microsoft Internet Explorer, Mozilla Firefox, Google Chrome, Apple Safari, or any other of the myriad software packages available for browsing the internet.

Various embodiments may operate in conjunction with any suitable operating system (e.g., Windows NT, 95/98/2000/CE/Mobile, OS2, UNIX, Linux, Solaris, MacOS, PalmOS, etc.) as well as various conventional support software and drivers typically associated with computers. Various embodiments may include any suitable personal computer, network computer, workstation, personal digital assistant, cellular phone, smart phone, minicomputer, mainframe or the like. Embodiments may implement security protocols, such as Secure Sockets Layer (SSL) and Transport Layer Security (TLS). Embodiments may implement any desired application layer protocol, including http, https, ftp, and sftp.

Various components, modules, and/or engines may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app. In some embodiments, a standalone system for a mobile and/or handheld device can be used to implement the applications.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems may utilize TCP/IP communications protocols as well as IPX, Appletalk, IP-6, NetBIOS, OSI, any tunneling protocol (e.g. IPsec, SSH), or any number of existing or future protocols. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, satellite networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network.

The system may be partially or fully implemented using cloud computing. "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

Various embodiments may be used in conjunction with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. Data tables having similar, though not identical, data in the key fields may also be linked by using AGREP, for example. Any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

The data set annotation may also be used for other types of status information as well as various other purposes. For example, the data set annotation may include security information establishing access levels (e.g., varying contents of games, broader dance moves, avatar movements, store contents, which can be accessed after achieving various point levels or stages). The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may implement a data storage arrangement wherein the header or trailer, or header or trailer history, of the data is stored on the transaction instrument in relation to the appropriate data.

Any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

Embodiments may connect to the Internet or an intranet using standard dial-up, cable, DSL or any other Internet protocol known in the art. Transactions may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Such firewalls may be of any desired type or configuration including Stateful Inspection, Proxy based, access control lists, and Packet Filtering among others. Firewalls may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. For example, the Microsoft Internet Information Server (IIS), Microsoft Transaction Server (MTS), and Microsoft SQL Server, may be used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In another example, an Apache web server can be used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Various embodiments may employ any desired number of methods for displaying data within a browser-based document. For example, data may be represented as standard text or within a fixed list, scrollable list, drop-down list, editable text field, fixed text field, pop-up window, and the like. Likewise, embodiments may utilize any desired number of methods for modifying data in a web page such as, for example, free text entry using a keyboard, selection of menu items, check boxes, option boxes, and the like.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The use of headings herein is merely provided for ease of reference, and shall not be interpreted in any way to limit this disclosure or the following claims.

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising: presenting, by a computing device, a virtual world having:
   a virtual display device; and an avatar in vicinity of the virtual display device in the virtual world;
      adjusting, by the computing device, a location of the avatar and an orientation of the avatar based on input received in a user device, wherein the location of the avatar changes as the avatar associated with the user device moves through the virtual world;
      capturing, by the computing device, a scene of the virtual world as seen by the avatar from a field of view of the avatar determined according to the location of the avatar and the orientation of the avatar, wherein the scene includes at least a portion of the virtual display device located in the virtual world;
      communicating, by the computing device to the user device, the scene captured from the virtual world; and
      causing the user device to display the scene with a video content that is associated with the virtual display device, wherein the video content is presented on the user device in the scene within the portion of the virtual display device.

2. The method of claim 1, wherein the video content is presented within the scene in a way corresponding to playing back the video content in the virtual world in the virtual display.

3. The method of claim 2, further comprising:
transmitting a video stream to the user device, the video stream includes the video content overlaid on the portion of the virtual display device.

4. The method of claim 2, further comprising:
streaming the video content to the user device, wherein the user device overlays the video content on the portion of the virtual display device.

5. The method of claim 2, further comprising:
clipping the video content according to a size of the portion of the virtual display device visible in the scene; and
transforming the video content according to an orientation of the virtual display device in the scene.

6. The method of claim 2, further comprising:
generating an audio stream from one or more audio sources in the virtual world based on distances from the one or more audio sources to ears of the avatar.

7. The method of claim 6, wherein the audio stream includes a stereo stream of audio corresponding sounds from the one or more audio sources in the virtual world being heard at the ears of the avatar.

8. The method of claim 1, wherein the avatar is a first avatar; the user device is a first user device; and the method further comprises:
presenting, by the computing device, a second avatar in the virtual world, the second avatar associated with a second user device;
receiving, in the computing device, an invitation from the first user device, the invitation identifying the second avatar;
communicating, by the computing device to the second device, the invitation;
receiving, in the computing device from the second device, an acceptance to the invitation; and
teleporting, by the computing device, the second avatar to vicinity of the first avatar in response to the acceptance.

9. The method of claim 8, further comprising, after the teleporting of the second avatar,
adjusting, by the computing device, a location of the second avatar and an orientation of the second avatar based on input received in the second user device;
capturing, by the computing device, a second scene of the virtual world as seen by the second avatar from a second field of view of the second avatar according to the location of the second avatar and the orientation of the second avatar, wherein the second scene includes at least a second portion of the virtual display device located in the virtual world; and
communicating, by the computing device to the second user device, the second scene captured from the virtual world;
causing the second user device to display the second scene with the video content within the second portion of the virtual display device in the second scene, wherein playback of the video content in the second scene is synchronized with playback of the video content in the first scene.

10. The method of claim 9, further comprising, after the teleporting of the second avatar:
establishing, via the computing device, a real time communication channel between the first user device and the second user device.

11. The method of claim 10, wherein the real time communication channel is configured to facilitate voice communications between a user of the first user device and a user of the second user device.

12. The method of claim 11, wherein the establishing of the real time communication channel is in response to a request from one of: the first user device and the second user device.

13. The method of claim 11, further comprising:
generating an audio stream from one or more audio sources in the virtual world based on distances from the one or more audio sources to ears of the first avatar; and
mixing the voice communications into the audio stream in providing the audio stream to the first user device.

14. The method of claim 11, further comprising:
receiving, by the computing device from the second user device, voice input in a first language;
translating, by the computing device, the voice input into a voice communication in a second language; and
generating an audio stream from audio sources in the virtual world based on distances from the audio sources to ears of the first avatar, using audio data from the audio sources, including audio associated with the virtual display device and the voice communication in the second language from the second avatar as heard in the ears of the first avatar.

15. The method of claim 1, further comprising:
receiving, in the computing device, an image of a user of the user device captured by a camera of the user device;
presenting, by the computing device, the avatar to second avatars associated with second user devices using the image.

16. The method of claim 1, wherein the user device is in communication with a sensor of a movement of a hand of a user of the user device; and the location of the avatar is adjusted based on the movement of the hand of the user.

17. The method of claim 16, wherein the sensor is mounted on the hand of the user and configured to determine a relative motion between the hand and a display device of the user device.

18. The method of claim 17, wherein the user device is in communication with a second sensor configured to detect at least one of: head movements and eye movements; and the orientation of the avatar is adjusted based on input from the second sensor.

19. A tangible, non-transitory computer-readable medium storing instructions that, when executed by a server computing device, cause the server computing device to perform a method, the method comprising:
presenting, by the computing device, a virtual world having:
a virtual display device; and
an avatar in vicinity of the virtual display device in the virtual world;
adjusting, by the computing device, a location of the avatar and an orientation of the avatar based on input received in a user device, wherein the location of the avatar changes as the avatar associated with the user device moves through the virtual world;
capturing, by the computing device, a scene of the virtual world as seen by the avatar from field of view of the avatar determined according to the location of the avatar and the orientation of the avatar, wherein the scene includes at least a portion of the virtual display device located in the virtual world;
communicating, by the computing device to the user device, the scene captured from the virtual world; and causing the user device to display the scene with a video content that is associated with the virtual display device, wherein the video content is presented on the user device in the scene within the portion of the virtual display device.

20. A server computing device, comprising:

at least one microprocessor; and memory coupled to the at least one microprocessor and storing instructions that, when executed by the at least one microprocessor, cause the computing device to:
- present a virtual world having:
  - a virtual display device; and
  - an avatar in vicinity of the virtual display device in the virtual world;
- adjust a location of the avatar and an orientation of the avatar based on input received in a user device, wherein the location of the avatar changes as the avatar associated with the user device moves through the virtual world;
- capture a scene of the virtual world as seen by the avatar from a field of view of the avatar determined according to the location of the avatar and the orientation of the avatar, wherein the scene includes at least a portion of the virtual display device located in the virtual world; and
- communicate, to the user device, the scene captured from the virtual world; and
- cause the user device to display the scene with a video content that is associated with the virtual display device, wherein the video content is presented on the user device in the scene within the portion of the virtual display device.

* * * * *